United States Patent
Ichikawa et al.

(10) Patent No.: US 7,615,273 B2
(45) Date of Patent: Nov. 10, 2009

(54) CELL STRUCTURE AND METHOD OF MANUFACTURING THE SAME

(75) Inventors: Yukihito Ichikawa, Nagoya (JP); Sadaaki Hirai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 464 days.

(21) Appl. No.: 10/585,350

(22) PCT Filed: Jan. 13, 2005

(86) PCT No.: PCT/JP2005/000306

§ 371 (c)(1),
(2), (4) Date: Jul. 6, 2006

(87) PCT Pub. No.: WO2005/068048

PCT Pub. Date: Jul. 28, 2005

(65) Prior Publication Data

US 2008/0220203 A1    Sep. 11, 2008

(30) Foreign Application Priority Data

Jan. 15, 2004    (JP) ............................. 2004-008263

(51) Int. Cl.
*B32B 3/12*    (2006.01)

(52) U.S. Cl. ................. 428/116; 428/310.5; 428/314.2; 428/118

(58) Field of Classification Search ........................ None
See application file for complete search history.

(56) References Cited

U.S. PATENT DOCUMENTS

| | | | |
|---|---|---|---|
| 3,441,381 A | 4/1969 | Keith et al. | |
| 5,260,035 A * | 11/1993 | Lachman et al. | 422/180 |
| 5,629,067 A | 5/1997 | Kotani et al. | |
| 6,077,483 A | 6/2000 | Locker et al. | |
| 2004/0071932 A1 | 4/2004 | Ishihara et al. | |
| 2006/0121240 A1 | 6/2006 | Hirai et al. | |
| 2006/0249888 A1 | 11/2006 | Ishihara et al. | |

FOREIGN PATENT DOCUMENTS

| JP | U 62-22823 | 2/1987 |
|---|---|---|
| JP | A 63-144836 | 6/1988 |

(Continued)

OTHER PUBLICATIONS

"Study on New Preparing Process of β Tricalcium Phosphate Bioactive Ceramics with High Properties," *J Biomed Eng*, vol. 16, pp. 52-55, 1999. (with Abstract).

*Primary Examiner*—Ling Xu
(74) *Attorney, Agent, or Firm*—Oliff & Berridge, PLC

(57) ABSTRACT

There is provided a cell structure, where the outer wall portion has high heat-insulating ability, the cell structural portion has a high temperature rise rate, and a temperature distribution is more uniform, and a method for manufacturing the cell structure. The cell structure 1 includes: a cell structural portion 4 having partition walls forming a plurality of cells extending from one end face to the other end face, and an outer wall portion 5 disposed on an outer peripheral surface of the cell structural portion 4. The outer wall portion 5 has at least a porous layer having a porosity of 40% or more or a porous layer having a hollow body. The manufacturing method can easily manufacture the cell structure.

7 Claims, 3 Drawing Sheets

FOREIGN PATENT DOCUMENTS

| | | |
|---|---|---|
| JP | U 63-144836 | 9/1988 |
| JP | A 3-275309 | 12/1991 |
| JP | A 5-269388 | 10/1993 |
| JP | 9-164337 A | 6/1997 |
| JP | A 11-36853 | 2/1999 |
| JP | A 2004-75524 | 3/2004 |
| JP | 2004-154768 A | 6/2004 |
| JP | 2004-231506 A | 8/2004 |

\* cited by examiner

CELL STRUCTURE AND METHOD OF MANUFACTURING THE SAME

TECHNICAL FIELD

The present invention relates to a cell structure having a cell structural portion having a plurality of cells communicating from one end face to the other end face and functioning as a fluid passage and an outer wall portion disposed on the outer peripheral surface of the cell structure and a method for manufacturing the cell structure. More particularly, the present invention relates to a cell structure having a highly heat-insulating outer wall portion and the manufacturing method thereof.

BACKGROUND ART

There has recently been used a cell structure having a catalyst carried thereon in order to remove nitrogen oxides, sulfur oxides, sulfur chloride, hydrogen chloride, hydrocarbon, carbon monoxide, and the like, contained in an exhaust gas to cope with an automobile exhaust gas regulation which becomes more tighten with the years. The cell structure purifies automobile exhaust gas by adsorbing and decomposing the above harmful substances contained in an automobile exhaust gas with a catalyst carried on the partition walls. In addition, a cell structure is also used as a filter for trapping particulate matter discharged from a diesel engine.

Since a catalyst used in the above cell structure having catalyst carried thereon generally has high catalytic activity in a high temperature range, the catalytic activity is low from the engine start-up of an automobile till temperature of the cell structure rises, and insufficiently purified exhaust gas is discharged. Therefore, it is required to make the operating of a cell structure as short as possible.

As one of the method, there is a method in which heat capacity is reduced to raise temperature of the cell structure in a short time from the engine start-up of an automobile. It is necessary to lighten (lower of bulk density) the cell structure without changing the geometric surface area of the cell structure to reduce heat capacity of the cell structure. Therefore, there is a method in which thickness of cell partition walls is thinned or a method in which porosity is increased. However, the thinning of cell partition walls and the lowering of bulk density by increasing porosity causes deterioration in mechanical strength.

In addition, a cell structure for purifying exhaust gas discharged from a large-sized vehicle such as a truck at a high flow rate requires a large capacity, and a cell structure having a large sectional area is required in order to reduce a pressure loss. However, a cell structure having a large sectional area has a problem of easy deformation because the cell partition walls in the outer peripheral portion of the cell structure cannot bear its own weight during extrusion forming (see Patent Document 1).

In order to inhibit the mechanical strength from being deteriorated, there has been proposed a method in which, after the cell structure is formed and fired, the partition wall deforming region of the outer peripheral portion is worked and removed, and a shell layer constituting an outer surface is formed by filling the depressed groove of the outer peripheral portion by coating the outer peripheral portion with ceramic cement, and a cell structure provided with the shell layer (see Patent Document 2). However, though mechanical strength of the cell structure can be improved in this methods a heat capacity of the cell structure is increased, a temperature rise rate of the cell structure upon engine start-up is lowered, and it is difficult for the catalyst activity of the loaded catalyst to rise in a short time. Further, there is a problem of a temperature difference between the central portion and the outer peripheral portion of the cell structure. Such a temperature difference is not preferable because catalytic activity and regeneration of the filter become uneven when the cell structure is used as a catalytic carrier and a filter. In addition, it causes crack generation, which is not preferable.

In addition, there has been proposed a method in which a coating layer is provided on the outer peripheral surface of the honeycomb structure in which the partition walls and the outer peripheral wall are unitarily extruded, to improve accuracy in an outer diameter of the honeycomb structure (see Patent Document 3). This proposal discloses a method for inhibiting a honeycomb structure from breakage upon canning, which is caused by deterioration in mechanical strength of the honeycomb structure due to thinning of the partition walls, by reducing canning bearing by optimizing a clearance range upon canning by improving accuracy in an outer diameter of the honeycomb structure. However, though canning resistance of the honeycomb structure can be improved by such a means in which a coating layer is provided on the outer peripheral surface of the honeycomb structure having unitarily produced partition walls and the outer peripheral wall, there arise problems that heat capacity of the outer wall portion increases and that the heat inside the honeycomb structure transfers to the outer wall side, which are the same as the aforementioned honeycomb structure in which the outer periphery is coated with ceramic cement.

Patent Document 1: JP-A-3-275309
Patent Document 2: JP-A-3-269388
Patent Document 3: JP-U-63-144836

DISCLOSURE OF THE INVENTION

The present invention has been made in view of the above problems and aims to provide a cell structure capable of improving a temperature rise rate in the cell structural portion by raising heat-insulating ability of the outer wall portion to make the temperature distribution more uniform and a method for suitably manufacturing the cell structure.

According to the present invention, there is provided a cell structure comprising:

a cell structural portion having partition walls forming a plurality of cells extending from one end face to the other end face, and an outer wall portion disposed on an outer peripheral surface of the cell structural portion;

wherein the outer wall portion has at least a porous layer having a porosity of 40% or more.

According to the present invention, there is also provided a cell structure comprising:

a cell structural portion having partition walls forming a plurality of cells extending from one end face to the other end face, and an outer wall portion disposed on an outer peripheral surface of the cell structural portion;

wherein the outer wall portion has at least a porous layer having a hollow body.

In the present invention, it is preferable that the outer wall portion has an inside shell layer located on the cell structural portion side and an outside shell layer located outside of the inside shell layer with the inside shell layer having a porosity higher than that of the outside shell layer, that the cell structural portion contains a ceramic material or a metallic material as a main component, and that the outer wall portion contains a ceramic material as a main component. In addition, the cell structural portion preferably has a honeycomb structure or a foam-shaped structure. Further, the cell structural portion preferably contains a material having adsorbability or catalytic capability, and the outer wall portion preferably contains a material having adsorbability or catalytic capability. It is also preferable that the cell structural portion has a honeycomb structure and that at least a part of cells are plugged at an end portion. A catalyst is preferably loaded on the inside of the cells and/or the inside of the partition walls, and the catalyst preferably has a function of purifying automobile exhaust gas.

According to the present invention, there is also provided a method for manufacturing a cell structure, comprising the steps of:

forming a formed body including partition walls forming a plurality of cells, firing the formed body to obtain a fired body, and disposing a coating material on a peripheral surface of the formed body or the fired body to form an outer wall portion;

wherein the coating material contains a pore former agent.

In the present invention, it is preferable that at least a part of the outer periphery of the formed body or the fired body is worked and removed before the step of forming the outer wall portion. In addition, the step of working and removing at least a part of the outer periphery is preferably conducted before the step of firing the formed body, and the step of working and removing at least a part of the outer periphery is preferably conducted after the step of firing the formed body. It is also preferable that, in the step of obtaining a formed body containing an outer wall unitarily joined with the partition walls in the step of obtaining a formed body and working and removing at least a part of the outer periphery, the outer periphery including the outer peripheral wall is worked and removed. It is also preferable that a method for manufacturing a cell structure, wherein, in the step of obtaining a formed body, a formed body excluding the outer peripheral wall is obtained, and a coating material is disposed on the outer peripheral surface of the formed body or the fired body to form the outer peripheral portion without working or removing the outer peripheral portion of the formed body and the fired body. In addition, the method preferably includes the step of plugging at least a part of cells at an end portion. The pore former is preferably one of carbon, a balloon, a foaming resin, a polyester resin, an acrylic resin, and a starch or a combination thereof, and the pore former preferably has a hollow body.

According to a cell structure of the present invention, lowering of a temperature rise rate of a cell structural portion, which is an abuse due to a disposition of the outer peripheral portion, can be inhibited with improving mechanical strength of a honeycomb structure by a disposition of the outer peripheral portion. In addition, according to a method for manufacturing a cell structure of the present invention, such a cell structure can easily be manufactured.

DESCRIPTION OF REFERENCE NUMERALS

1: cell structure, 2: partition wall, 3: cell, 4: cell structural portion, 5: outer wall portion, 6: inside shell layer, 7: outside shell layer, 10: honeycomb structure, 20: foam-shaped structure, 42, 44: end portion

BEST MODE FOR CARRYING OUT THE INVENTION

Embodiments of the invention are described in detail with referring to drawings. However, the present invention is not limited to these embodiments. Incidentally, hereinbelow, a section means a section perpendicular to a passage direction (longitudinal direction) of cells as long as particular notice is not made.

Figure 1A:
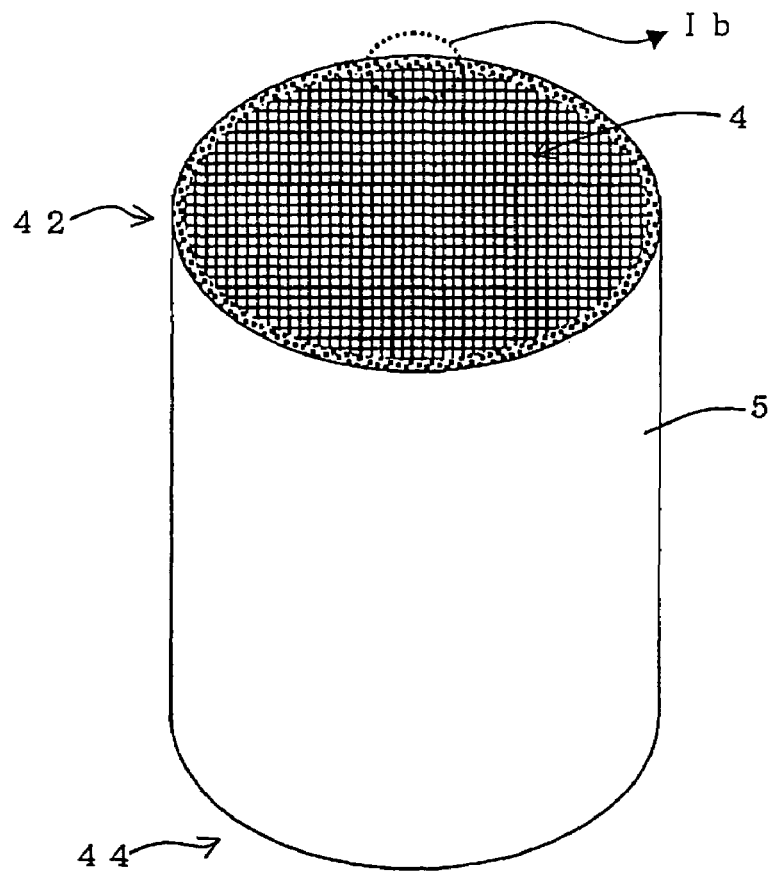
FIG. 1(a) is a schematic perspective view showing an embodiment of a cell structure of the present invention.
Figure 1B:
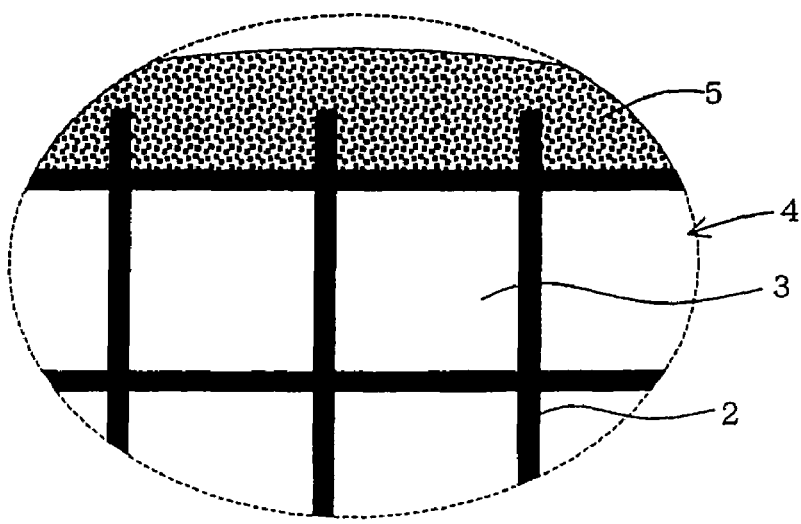
FIG. 1(b) is a partially enlarged view of the Ib portion of FIG. 1(a).

FIG. 1(a) is a schematic perspective view showing an example of a honeycomb structure, which is an embodiment of a cell structure of the present invention, FIG. 1(b) is a partially enlarged view of the Ib portion of FIG. 1(a). The honeycomb structure 10 (cell structure 1) shown in FIGS. 1(a) and 1(b) is provided with a cell structural portion 4 having a honeycomb structure and an outer wall portion 5. The cell structural portion 4 of the honeycomb structure 4 has partition walls 2 forming cells 3 extending from one end face 42 to the other end face 44. Further, a depression extending in a groove state in the longitudinal direction of the cells 3 in the outer peripheral surface of the cell structural portion 4. The outer wall portion 5 is disposed in the outer periphery of the cell structural portion 4. The outer wall portion 5 is disposed so that a part may get into the depression of the cell structural portion 4.

The honeycomb structure 10 is porous with the outer wall portion 5 having a porosity of 40% or more, preferably 50% or more, more preferably 60% or more. By making the outer wall portion 5 porous, the outer wall portion 5 serves as a heat-insulating layer, heat of the cell structural portion is hardly transmitted to outside through the outer wall. This inhibits heat from transferring to the outer wall portion 5 side when the cell structural portion 4 is heated, and temperature can be raised in a short time. Therefore, when a catalyst is loaded, catalyst activity can be enhanced in a short time. Such a honeycomb structure 10 can particularly suitably be used as a thin-walled large-sized honeycomb structure for purifying diesel exhaust gas.

In addition, when the honeycomb structure is used as a filter for trapping soot discharged from a diesel engine, there is a problem that soot remains without being burnt because temperature in the periphery of the filter, particularly, a part near a discharge port of the filter becomes relatively low upon regeneration. This problem is due to the transferring of the heat to the outer wall portion. By using the above honeycomb structure, uniformalization of temperature in the cell structural portion can be planned, and effect in inhibiting soot from remaining without being burnt upon regeneration can be obtained.

Figure 2A:
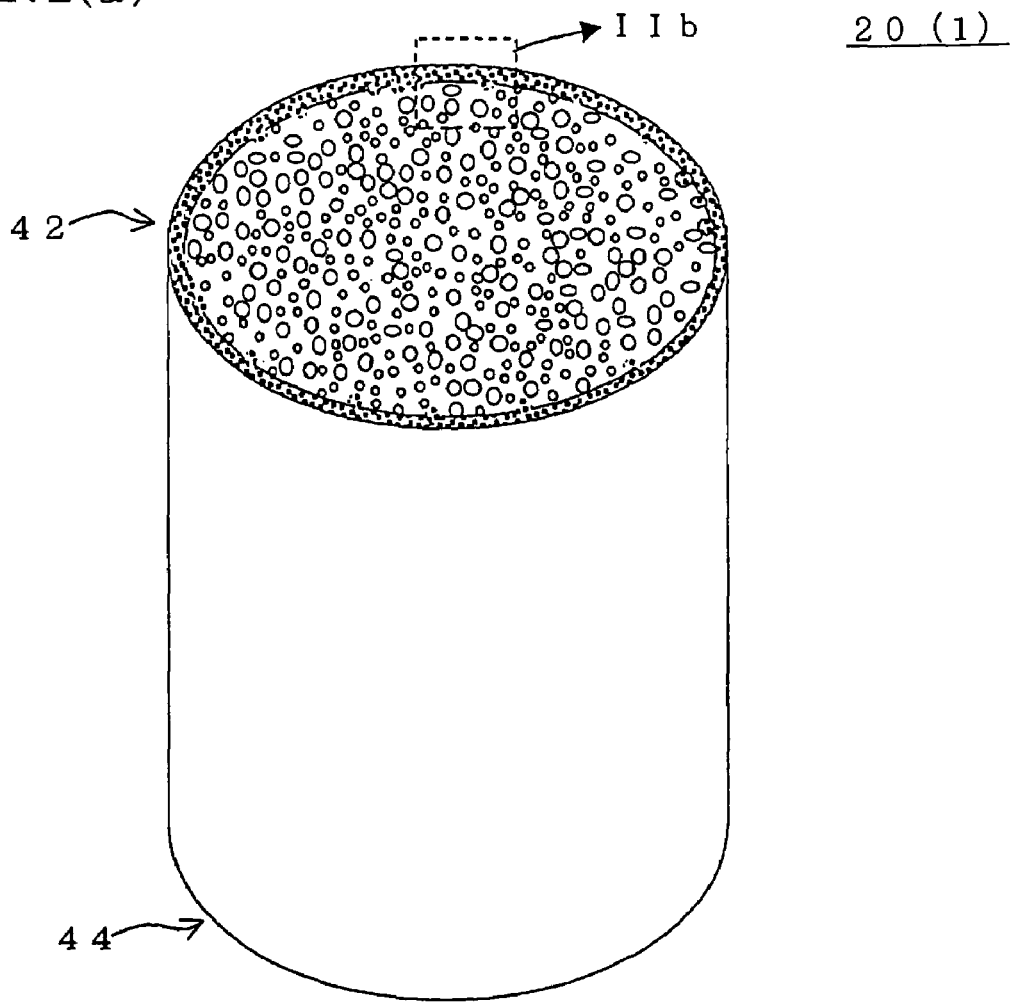
FIG. 2(a) is a schematic perspective view showing another embodiment of a cell structure of the present invention.
Figure 2B:
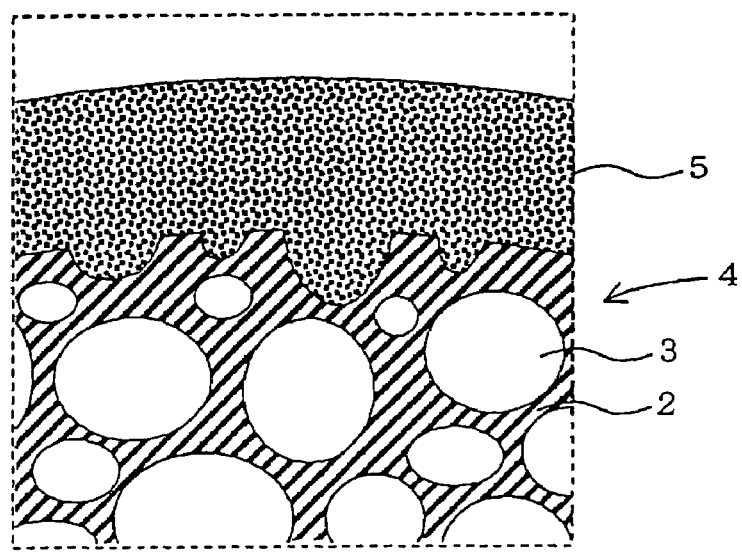
FIG. 2(b) is a partially enlarged view of the IIb portion of FIG. 2(a).

FIG. 2(a) is a schematic perspective view showing another embodiment of a foam-shaped structure 20 (cell structure 1), which is another embodiment of a cell structure of the present invention. FIG. 2(b) is a partially enlarged view of the IIb portion of FIG. 2(a). The foam-shaped structure 20 shown in FIGS. 2(a) and 2(b) is provided with a cell structural portion 4 containing partition walls 2 disposed so as-to form a plurality of cells 3 which communicate with one another three-dimensionally and function as fluid passages and an outer wall portion 5 disposed in the outer periphery of the cell structural portion 4. In addition, the cells 3 extend from one end face 42 to the other end face 44. The outer wall portion 5 is porous with a porosity of 40% or more, preferably 50% or more, more preferably 60% or more. Also in a cell structure 1 having such a form, an effect similar to the aforementioned effect can be obtained. Incidentally, preferable embodiments of the present invention will hereinbelow described mainly based on embodiments of a honeycomb structure. However, these can be applied to a foam-shaped structure.

In a cell structure 1 shown in FIGS. 1(a), 1(b), and 2(a), the outer wall portion 5 preferably has a porosity of 40% or more, more preferably 50% or more, and particularly preferably 60% or more as described above. However, too high porosity reduces strength, which is not preferable. Therefore, the porosity is preferably 80% or less, more preferably 70% or less, further preferably 60% or less. However, in the case that the outer wall layer is constituted by a plurality of layers with an inside shell layer having high porosity and an outside shell layer having low porosity to enhance strength of the outer wall layer, it is also preferable that the inside shell layer has a porosity of 80% or more.

The outer wall portion preferably has a four point bending strength (based on JIS1601) of 0.5 MPa or more, more preferably 1.0 MPa or more, and particularly preferably 2.0 MPa or more. As a pore characteristic in the outer wall portion, the mean pore diameter based on volume measured by mercury porosimetry is preferably 100 μm or less, more preferably 50 μm or less, and particularly preferably 25 μm or less. With respect to a pore distribution characteristic of the outer wall portion, an optional pore distribution characteristic can be obtained by a known method such as selection or the like of a hollow body as a pore former or other manufacturing conditions. The outer wall portion preferably has a thermal expansion coefficient (average from room temperature to 800° C.) of $5.0 \times 10^{-6}/°$ C. or less, $3.0 \times 10^{-6}/°$ C. or less, particularly $2.0 \times 10^{-6}/°$ C. or less. The outer wall portion has a specific heat of 5000 J/kgK or less, more preferably 3000 J/kgK or less, particularly preferably 1000 J/kgK or less at 500° C., and a thermal conductivity of 5 W/mK or less, more preferably 3 W/mK or less, particularly preferably 1 W/mK or less.

In addition, in the cell structure, it is preferable that the outer wall portion 5 has a form containing a hollow body. Examples of the hollow body include a silica balloon, a fly-ash balloon, a shirasu balloon, and a glass balloon. Stable heat-insulating ability can be obtained by containing such a hollow body. If the hollow body has a moderate strength, structural strength of the outer wall portion can be enhanced, and improvement in strength of a honeycomb structure against external pressure from a side face of the honeycomb structure can be expected. Further, an effect of inhibiting a dry crack generated upon drying with applying a coating material can be expected. It is more preferable that the hollow body has water retentivity or water absorbability for the effect in inhibiting a dry crack. This effect seems to be obtained because the hollow body mitigates rapid transfer or scattering of water in a coating layer upon drying. Porosity of the outer wall portion is measured by subjecting a test sample taken out from the outer wall portion to mercury porosimetry. Therefore, in the case of the outer wall portion containing the hollow body, mercury cannot get into the hollow body since the hollow body remains in the outer wall portion. Therefore, porosity of the hollow body is not reflected to the measurement, and porosity of only a substrate portion of the outer wall portion is measured.

Figure 3:
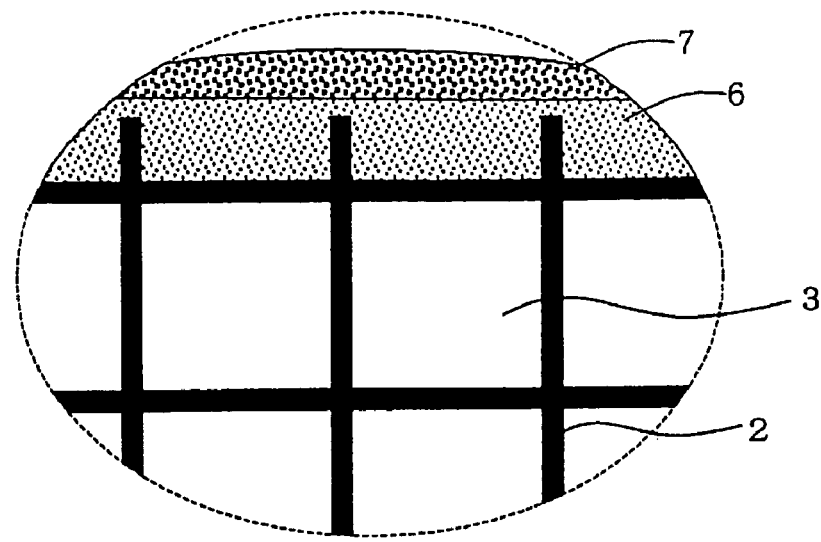
FIG. 3 is a partially enlarged view schematically showing still another embodiment of a cell structure of the present invention.

FIG. 3 is a schematic partially enlarged view showing a cell structure of still another embodiment. In the cell structure 1 shown in FIG. 3, the outer wall portion 5 contains the inside shell layer 6 and the outside shell layer 7. The inside shell layer 5 has higher porosity than the outside shell layer 7. By raising the porosity of the inside shell layer 6 located on the cell structural portion 4 side, a heat-insulating effect can be enhanced; and by lowering the porosity of the outside shell layer 7 located on the outer peripheral side of the inside shell layer 6, strength can be enhanced. Thus, the heat-insulating effect and strength can be balanced at a high level as a whole outer wall. The difference in porosity between the inside shell layer and the outside shell layer is preferably 5% or more, more preferably 10% or more from the viewpoint of heat-insulating ability. When the inside shell layer has a porosity of 40% or more, the outside shell layer may have a porosity of less than 40%. The difference in thermal expansion coefficient between the inside shell layer and the outside shell layer is preferably $8 \times 10^{-6}/°$ C. or less, more preferably $4 \times 10^{-6}/°$ C. or less from the viewpoint of thermal shock resistance. As a means to enhance strength of the outside shell layer, porosity of the outside shell layer is preferably made low. However, by lowering the porosity, the layer itself becomes dense, and heat capacity is increased, which lowers the heat-insulating effect. Therefore, by mixing a hollow body having moderate strength in the outside shell layer, density of the whole outside shell layer is increased, and strength can be improved with inhibiting heat capacity from rising. The hollow body for raising strength is preferably inorganic and has heat resistance such as a shirasu balloon or a fly-ash balloon. These can maintain the hollow-shape and strength of the outside shell layer even when they are exposed to high temperature due to heat upon thermal treatment by catalyst loading or heat of exhaust gas during practical use after a honeycomb structure is produced.

In order to enhance heat-insulating ability of the whole outer wall portion, it is preferable to raise porosity of the inside shell layer, and porosity (can be raised by mixing a hollow body in the inside shell layer. In the case of enhancing strength of the whole outer wall portion, the hollow body is preferably inorganic and heat resistant such as a shirasu balloon or a fly-ash balloon as described above. If improvement in strength of the inside shell layer is not important, the hollow body is preferably resin such as foaming resin or organic matter such as starch with making much of lowering heat capacity. Since such a hollow body is decomposed and disappears due to a thermal treatment after coating, it contributes to lowering of heat capacity of the inside shell layer. As characteristics of a material for the outer peripheral coating material itself besides porosity, strength, thermal resistance, thermal shock resistance, specific heat, and thermal conductivity are factors for designing. As a means for enhancing strength of the outside shell layer, there can be used a means of densification by a thermal treatment by impregnating the outside shell layer with silica sol or a means of densification by a high temperature treatment of the outside shell layer by irradiation using xenon lamp or a far infrared radiation besides a means of mixing a hollow body as described above. Means are not limited to these means, and there may be employed a known densification means or a reinforcing means by adding particles, or the like.

As the main component of the cell structural portion, a ceramic material or a metal material can suitably be used. As the main component of the outside wall portion, a ceramic material can suitably be used. The ceramic material is at least one selected from the group consisting of cordierite, alumina, mullite, lithium aluminum silicate, aluminum titanate, titania, zirconia, silicon nitride, aluminum nitride, and silicon carbide, or a composite material thereof. In addition, the cell structural portion may contain a material having an adsorption function and/or a catalyst function such as activated carbon, silica gel, and zeolite. Further, a metal material can suitable be used as the main component of the cell structural portion in that effect of raising temperature of inner peripheral cells of the cell structural portion without heat transfer in a shot time due to the present embodiment is exhibited remarkably since heat transfer to the outer wall is large because a metal material has high thermal conductivity. The outer wall portion preferably contains ceramic fibers and a noncrystalline oxide matrix (e.g., matrix formed of colloidal silica or colloidal alumina) present among the ceramic fibers in addition to the above particles of a ceramic material, for example, cordierite particles. In addition, a material having high heat resistance such as SiC particles may be contained for the purpose of further imparting heat resistance. Further, a material having an adsorption function and/or a catalyst function such as activated carbon, silica gel, and zeolite may be contained. Thus, a cement material obtained by combining various kinds of materials may be used. Here, the main component means a material constituting more than 80% by mass of each portion.

In a cell structure of the present invention, it is preferable to load a catalyst on a surface inside cells (surface of partition walls) and/or on a inside surface of pores inside the partition walls. This is suitably used for purifying exhaust gas by adsorbing and absorbing gaseous components such as HC, $NO_x$, and CO and/or solid components having carbon as a core, and particulate matter such as SOF contained in an exhaust gas discharged from an internal combustion engine such as automobile exhaust gas. When a cell structure of the present invention is used in this manner, it becomes more advantageous because a temperature rise rate becomes particularly important to activate a catalyst in an early stage. Examples of the preferable catalyst include noble metals such as Pt, Pd, and Rh, alkali metals, alkaline earth metals, and rare earth elements, and at least one kind of them is preferably loaded inside the cells and/or inside the aforementioned partition walls. For example, γ alumina having high specific surface area is coated with a thickness of several μm or several tens of um inside the cells and/or inside the aforementioned partition walls to form a coat layer, and a catalyst as described above, for example, Pt particles and Pd particles are dispersed and loaded on a surface of micropores in the alumina, and thereby HC or the like in exhaust gas passing through the cells and/or the cell partition walls can effectively be subjected to an oxidation treatment.

Figure 4:
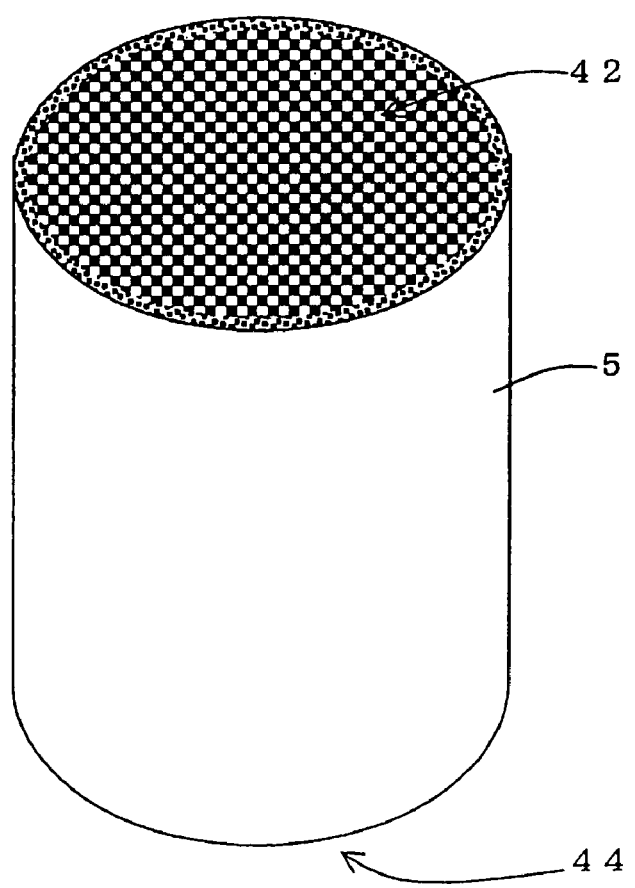
FIG. 4 is a schematic perspective view showing still another embodiment of a cell structure of the present invention.

In a cell structure, particularly, in a honeycomb structure of the present invention, at least a part of cells are preferably plugged at an end in the case of using the structure as a filter. Further, as shown in FIG. 4, by a structure where the cells are alternately plugged in both end portions 42, 44 so that the end portions 42, 44 have a checkerwise pattern, all fluid pass through cell partition walls. Therefore, such a honeycomb structure can suitably be used as a filter. When the structure is used as a filter, it is necessary for the partition walls of the cell structure to be made of porous material, and the ceramic materials described above may suitably be employed. Particularly, in the case that a honeycomb structure is used as a filter for trapping soot discharged from a diesel engine, the trapped soot is sometimes removed by combustion for regeneration of the honeycomb structure. In this regeneration, to cope with the problem that the soot remains unburnt, it is preferable to use a honeycomb structure of an embodiment of the present invention as such a filter.

There is no particular limitation to a sectional shape of a cell structure of the present invention, and the shape may be an oval, an ellipse, or a deformed shape besides a circle. Though there is no particular limitation on a sectional area of a cell structure, a cell structure preferably has a sectional area corresponding to a circle having a diameter of 100 mm or more, particularly preferably 130 mm or more because the present invention can be applied more suitably to a large-sized cell structure. There is no particular limitation on a sectional shape of cells, and any of a triangle, a rectangle, a hexagon, a circle, and the like, may be employed. There is no particular limitation on thickness of partition walls, and it may be, for example, 30 to 2000 μm, preferably 40 to 1000 μm, and more preferably 50 to 500 μm. Since the present invention can suitably be applied particularly to a cell structure having thin partition walls, a cell structure having a partition wall thickness of 130 μm or less, particularly 80 μm or less is a particularly preferable embodiment. In addition, partition walls are preferably porous, and a porosity of, for example, 30 to 90 vol % is preferable. There is no particular limitation on cell density (number of cells per unit area), and it is, for example, 6 to 2000 cells/inch$^2$ (0.9 to 311 cells/cm$^2$), preferably 50 to 1000 cells/inch$^2$ (7.8 to 155 cells/cm$^2$), and more preferably 100 to 400 cells/inch$^2$ (15.5 to 62.0 cells/cm$^2$).

Next, a method for manufacturing a cell structure of the present invention will be described on the basis of an example. In this example, first clay is prepared from a forming raw material. That is, to the main component suitable for the above cell structural portion or to the raw material for forming the suitable main component, for example, a cordierite-forming raw material which becomes cordierite by firing or a silicon carbide powder and a metal silicon powder for forming a silicon carbide-metal silicon composite, or the like, is added a binder, for example, methyl cellulose and hydroxypropoxylmethyl cellulose, and further a surfactant and water are added thereto. They are kneaded to give clay. Here, a cordierite-forming raw material means a mixture of talc, kaolin, calcined kaolin, alumina, aluminum hydroxide, silica, and the like at a predetermined ratio to have a chemical composition of 42 to 56% by mass of $SiO_2$, 30 to 45% by mass of $Al_2O_3$, and 12 to 16% by mass of MgO.

Next, by forming the clay, a formed body containing partition walls forming a plurality of cells is obtained. Though there is no particular limitation on a method of forming, extrusion forming is generally preferable, and a plunger-type extruder, or a biaxial screw-type continuous extruder is preferably used. By using a biaxial screw-type continuous extruder, a clay-forming step and a forming step can continuously be performed. At this time, a formed body without the outer peripheral wall may be formed. However, it is preferable to form a formed body containing the outer peripheral wall which is unitarily formed together with partition walls from the view point of inhibiting the partition walls from being deformed.

Next, after the formed body is subjected to, for example, microwave drying, dielectric drying and/or hot air drying, the dried formed body is fired to obtain a fired body. Firing temperature and atmosphere at this time can suitable be changed depending on raw materials used, and those skilled in the art can select the optimum firing temperature and atmosphere. For example, when a cordierite-forming raw material is used, after heating and degreasing in an ambient atmosphere, firing is performed at the highest temperature of about 1400 to 1450° C. in an ambient atmosphere. When a silicon carbide powder and a metal silicon powder are used as raw materials, after heating and degreasing in an ambient or $N_2$ atmosphere, firing is performed at about 1550° C. in an Ar atmosphere. Generally, a continuous furnace such as a single kiln or a tunnel for firing, and thereby degreasing and firing can be performed simultaneously or continuously.

Next, as necessary, at least a part of the outer periphery or preferably the whole outer periphery of the fired body is worked removed. Though this step is not essential, it is preferable to remove partition walls near the outer periphery since partition walls near the outer periphery sometimes deform in the steps to this point. In addition, in the case that a formed body containing the outer peripheral wall unitarily joined with partition walls was obtained in the step of obtaining a formed body, it is necessary to remove the outer peripheral wall. Also at this time, it is necessary to remove the outer peripheral wall together with partition walls near the outer peripheral wall. The step of removing at least a part of the outer periphery may be performed to a formed body before firing. Regarding the range where the outer peripheral wall is removed, the outer periphery of the formed body or the fired body is worked and removed in such a manner that, for example, two or more cells from the outer periphery are removed, more preferably two to four cells are removed. Before removing cells, a part of the partition walls forming the cells is worked and removed in the outer peripheral surface of the formed body or the fired body in such a manner that the cells form a protrusion opening on the outer peripheral surface, and thereby, in a step of disposing a coating material described later, the coating material can be disposed so as to get into the protrusion, which can improve the strength of the outer wall. Incidentally, by obtaining a formed body without the outer peripheral wall in the step of obtaining a formed body, the step of removing the outer periphery is sometimes not required. Therefore, it is also preferable to obtain a formed body without the outer peripheral wall and perform the step of forming the outer wall portion described later without working or removing of the outer peripheral portion.

Next, a coating material containing a pore former is disposed in the outer periphery of the fired body to form the outer wall portion. By mixing a pore former in the coating material, the outer wall portion having high porosity can easily be formed. There is no particular limitation on a pore former as long as it can form pores in the outer wall portion, and examples of the pore former include carbon; balloons such as a silica balloon, a fly-ash balloon, a shirasu balloon, and a glass balloon; unfoamed or foamed foaming resins; polyester resins such as a homopolymer and copolymer of poly(ethylene telephthalate); acrylic resins such as a homopolymer and copolymer of poly(methyl methacrylate); and starch. Among them, balloons, which are hollow bodies, and foamed foaming resins are preferable from the view point of being capable of effectively forming pores having a predetermined shape, and inorganic hollow bodies, which does not disappear even by firing, is preferable.

Though there is no particular limitation on an amount of the pore former, an amount for obtaining 30% or more of porosity of the outer wall portion is preferable, an amount for obtaining 40% or more of porosity of the outer wall portion is more preferable, and an amount for obtaining 50% or more of porosity of the outer wall portion is particularly preferable. In addition, an amount for obtaining porosity of 80% or less is preferable, an amount for obtaining porosity of 70% or less is more preferable, an amount for obtaining porosity of 60% or less is particularly preferable. Specifically, an amount of pore former is preferably 3 parts by mass or more with respect to 100 parts by mass of a coating material excluding a pore former, more preferably 5 parts by mass or more, and particularly preferably 15 parts by mass or more; and preferably 30 parts by mass or less, more preferably 25 parts by mass or less, and particularly preferably 20 parts by mass or less.

The coating material preferably contains at least one kind selected from the group described above as ceramic materials suitable as the main component of the outer wall besides the aforementioned pore former, and it is more preferable that the coating material contains ceramic particles of the same kind as the main component of the cell structural portion. Examples of the ceramic particles include cordierite, alumina, mullite, lithium aluminum silicate, aluminum titanate, titania, zirconia, silicon nitride, aluminum nitride, and silicon carbide. The coating material preferably contains colloidal silica and/or colloidal alumina besides ceramic particles, more preferably contains ceramic fibers, further preferably contains an inorganic binder, and furthermore preferably contains an organic binder. It is preferable to add a liquid component such as water to these raw materials to prepare slurry for disposing as a coating material.

In addition, in the case of disposing a coating material to a fired body, it is preferably to dry by heating after a coating material is disposed because the outer peripheral wall can be formed by causing evaporation of the liquid component in an early stage. For example, strength of the outer peripheral wall can be increased by drying it at a temperature of 80° C. or more. Incidentally, there is no particular limitation on a method of disposing the coating material, and a method such as spray coating can be employed besides application or the like which has conventionally been conducted.

In order that the outer wall portion may contain the inside shell layer and the outside shell layer, a coating material containing a high content of a pore former is disposed in the outer periphery of the cell structural portion, and a coating material containing a low content of a pore former is disposed on the outside thereof.

The thus formed cell structure is different from a general cell structure, that is, a cell structure where the partition walls and the outer peripheral wall are unitarily formed by unitary extrusion forming of the partition walls and the outer peripheral wall, drying, and forming. In a cell structure of the present invention, in the case that firing is not performed after a coating material is disposed on the outer peripheral surface of the fired body, a physical interface is present between the cell structural portion and the outer wall portion. In addition, also in the case of firing after a coating material is disposed on the outer peripheral surface, an interface may be present between them if the materials are different. Even when they are of the same material, in the case of the material is cordierite, since the cell structural portion, which is formed by extrusion, and the outer wall portion, which is formed by disposition, have different orientation, an interface is present between them. Even if they are of the same material other than cordierite, a systematic interface due of a difference in pore form or in crystalline particle form or a chemical interface due to a difference in element distribution may be present because of a little difference in composition or a difference in formation process. On the other hand, a general cell structure does not have such an interface because they are formed of the same material in the same forming process. Therefore, it is difficult to strictly distinguish the outer wall portion from the cell structure in a general cell structure. However, in a cell structure formed in the above manufacturing method, it is possible to distinguish the outer wall portion from the cell structure.

A method for manufacturing a cell structure of the present invention preferably includes a step of joining a plurality of forming bodies or firing bodies, preferably firing bodies. By this step, the formed cell structure has a structure where a plurality of segments of a cell structure are joined, which improved thermal shock resistance. There is no particular limitation on a bonding material used in the joining step, and a material similar to the coating material may be used, for example. Though this step is preferably performed before a step of forming the outer wall, in the case that the manufacturing method contains an optional step of removing the outer periphery, it is preferably performed before the step. That is, it is preferable that, after a plurality of formed bodies or fired bodies are joined in the joining step to give a predetermined size, the outer periphery is removed to give a cell structure having a desired shape.

In addition, in the case of using a cell structure, particularly a honeycomb structure, as a filter, particularly a DPF or the like, it is preferable to plug an end face of an opening of a part of cells with a plugging material in the case of using the structure as a filter. Further, as shown in FIG. 4, it is preferable that cells are alternately plugged in both end portions 42 and 44 so that both end portions shown a checkerwise pattern. Plugging can be performed by masking cells which are not plugged, a plugging material is slurried and disposed on the end faces of openings of segments, drying, and firing. It is preferable to perform plugging after the forming step and before the firing step because only one firing step is required. However, plugging may be performed after firing, or any time after forming. There is no particular limitation on a plugging material, and the same material as the forming raw material may be used. In addition, in the case of loading catalyst on the cell structure, a catalyst can be loaded inside cells and/or inside the above partition walls by wash-coating a solution or slurry containing the aforementioned preferable catalyst and heating it.

EXAMPLES

The present invention will hereinbelow be described in more detail based on Examples. However, the present invention is by no means limited to these Examples.

(Production of Cell Structural Portion)

To a cordierite-forming raw material, that is, particle talc, kaolin, alumina, and other cordierite-forming raw materials were added a forming auxiliary, a pore former, and water for preparation. They were mixed and kneaded, and the kneaded substance (clay) was subjected to extrusion forming to produce a honeycomb-shaped formed body. Then, a plugging material was introduced in the openings of predetermined cells and dried, and then the honeycomb-shaped formed body was fired to obtain a honeycomb-shaped fired body where a predetermined opening portions were plugged. Then, the outer periphery of the fired body was removed by grinding to make the outer diameter smaller than a predetermined diameter. Thus, a cell structural portion (cell structure: partition wall thickness of 0.42 mm, cell pitch of 2.5 mm) having partition walls forming a plurality of cells and having a protrusion extending in a groove shape in a cell passage direction on the outer peripheral surface was obtained.

(Forming of Outer Wall Portion)

A coating material having a preparation ratio (parts by mass) shown in Table 1 was prepared, the coating material was applied on the outer peripheral surface of the cell structure dried, and calcined at 400° C. to obtain each of the honeycomb structures (diameter of 267 mm, length of 178 mm, and outer wall portion thickness of 1.2 mm) of Examples 1 to 6 and Comparative Example 1. In addition, an inside coating material, which forms the inside shell layer, and the outside coating material, which forms the outside shell layer, were prepared at a preparation ratio (parts by mass) shown in Table 2. After the inside coating material was applied on the outer peripheral surface of the cell structural portion which was the same as the above one and dried, the outside coating material was applied on the inside coating material, followed by calcining at 400° C. to obtain each of the honeycomb structures (diameter of 267 mm, length of 178 mm, inside shell layer thickness of 0.7 mm, and outside shell layer thickness of 0.7 mm) of Examples 7 and 8.

TABLE 1

| Component | Comp. Ex. 1 | Example 1 | Example 2 | Example 3 | Example 4 | Example 5 | Example 6 |
| --- | --- | --- | --- | --- | --- | --- | --- |
| Cordierite powder | 60.0 | 60.0 | 60.0 | 60.0 | 60.0 | 60.0 | 60.0 |
| Colloidal silica | 18.0 | 18.0 | 18.0 | 18.0 | 18.0 | 18.0 | 18.0 |
| Ceramic fiber | 3.2 | 3.2 | 3.2 | 3.2 | 3.2 | 3.2 | 3.2 |
| Inorganic additive | 0.6 | 0.6 | 0.6 | 0.6 | 0.6 | 0.6 | 0.6 |
| Organic additive | 0.2 | 0.2 | 0.2 | 0.2 | 0.2 | 0.2 | 0.2 |
| Water | 18.0 | 18.0 | 18.0 | 18.0 | 18.0 | 18.0 | 18.0 |
| Pore former (superaddition) | 0.0 | 3.0 | 5.0 | 10.0 | 15.0 | 25.0 | 30.0 |

Pore former: foamed resin (F-50E produced by Matsumoto Yushi Co., Ltd.), mean particle diameter of about 40 μm

TABLE 2

| | Example 7 | | Example 8 | |
| --- | --- | --- | --- | --- |
| Component | Inside coating material | Outside coating material | Inside coating material | Outside coating material |
| Cordierite powder | 60.0 | 60.0 | 60.0 | 60.0 |
| Colloidal silica | 18.0 | 18.0 | 18.0 | 18.0 |
| Ceramic fiber | 3.2 | 3.2 | 3.2 | 3.2 |
| Inorganic additive | 0.6 | 0.6 | 0.6 | 0.6 |
| Organic additive | 0.2 | 0.2 | 0.2 | 0.2 |
| Water | 18.0 | 18.0 | 18.0 | 18.0 |
| Pore former 1 (superaddition) | 10.0 | | 30.0 | |
| Pore former 2 (superaddition) | | 3.0 | | 10.0 |

Pore former 1: foamed resin (F-50E produced by Matsumoto Yushi Co., Ltd.), mean particle diameter of about 40 μm
Pore former 2: fly-ash balloon, mean particle diameter of about 40 μm (Measurement of Porosity of Outer Wall Portion)

The outer wall portion was cut out from the honeycomb structure obtained above to measure porosity thereof. The method of measuring porosity will hereinbelow be described. Incidentally, it is possible to obtain pore diameter distribution simultaneously with the measurement of porosity, and a mean pore diameter on the basis of volume is used as a representative value.
1) After a sample was dried for two hours at 150° C., the sample was put in a container and set in an apparatus. In the case that a foaming resin was added as a pore former, it was set after a thermal treatment for one hour at 550° C.
2) Mercury was put in the container, and a pressure corresponding to a prescribed pore diameter to obtain volume of mercury absorbed by the sample.
3) Pore distribution was obtained by calculating from the pressure and the volume of absorbed mercury.
4) Pore capacity was obtained by calculating from the volume of absorbed mercury by applying a pressure of 68.6 MPa (700 kgf/cm$^2$).
5) Porosity was obtained by the following formula from the total pore capacity.
Porosity (%)=total pore capacity (per 1 g)×100/(total pore capacity (per 1 g)+1/2.52)
(Measurement of Temperature Rise Rate of Outer Wall Portion)
The honeycomb structure obtained was set in a burner test apparatus, and a combustion gas at about 400° C. was sent into the cell structural portion of the ceramic honeycomb structure. At that time, temperature of the outer wall portion was measured, and time until the temperature of the outer peripheral portion stopped rising and became constant was evaluated. In addition, after the evaluation, the ceramic honeycomb structure was taken out, and presence/absence of chipped portion of the outer peripheral coating portion.

Table 3 shows porosity of the outer wall portion, time until the temperature of the outer peripheral portion became constant, and the results of evaluations of presence/absence of chipped portion. Incidentally, each of porosity of the outer wall portion, time until the temperature of the outer peripheral portion became constant, and the results of evaluations of presence/absence of chipped portion was evaluated by n=2.

portion were observed. It can be considered that this is because strength of the outer wall portion was deteriorated because of high porosity. However, even with such porosity, the deterioration in strength can be filled up with using a raw material component having higher strength or the like, and thereby Examples 5 and 6 can be considered to be within a range of practical use.

In Examples 7 and 8, where the outer wall portion has two layers of the outside shell layer, and the inside shell layer, a heat-insulating effect could be obtained by making the inside shell layer have a high porosity, and high strength could be obtained by making the outside shell layer have a relatively low porosity.

INDUSTRIAL APPLICABILITY

As described above, since the outer wall portion has high heat-insulating ability in a cell structure of the present invention, a temperature rise rate of the cell structural portion can be improved, and a temperature distribution in the cell structural portion can be made more uniform. Therefore, a cell structure of the present invention can widely be used as a catalyst carrier for purifying exhaust gas, a filter, or the like. In addition, a method for manufacturing a honeycomb structure of the present invention can suitably be used in manufacturing a honeycomb structure as described above.

The invention claimed is
1. A cell structure comprising:
a cell structural portion having partition walls forming a plurality of cells extending from one end face to the other end face, and
an outer wall portion disposed on an outer peripheral surface of the cell structural portion;
wherein the outer wall portion has at least a porous layer having a porosity of 40% or more or a porous layer having a hollow body,

TABLE 3

| | Porosity (%) | | Time till temperature became constant (min.) | | Chipped portion |
|---|---|---|---|---|---|
| Comp. Ex. 1 | 37.4 | | 39.8 | 32 | 30 | None |
| Example 1 | 40.3 | | 41.2 | 36 | 37 | None |
| Example 2 | 45.5 | | 43.2 | 40 | 42 | None |
| Example 3 | 56.3 | | 56.1 | 45 | 48 | None |
| Example 4 | 64.9 | | 62.9 | 51 | 49 | None |
| Example 5 | 76.4 | | 77.6 | 65 | 64 | a few (in both) |
| Example 6 | 81.5 | | 80.1 | 70 | 75 | present (in both) |
| Example 7 | 55.1 (inside) 36.1 (outside) | | 56.0 (inside) 37.6 (outside) | 45 | 44 | None |
| Example 8 | 80.6 (inside) 38.5 (outside) | | 80.2 (inside) 36.7 (outside) | 68 | 74 | None |

As shown in Table 3, it was confirmed that each of Examples 1 to 6, where a coating material containing a pore former, had high porosity and long time until temperature of the outer wall portion became constant by the burner test in comparison with Comparative Example 1. That is, it was shown that each of the honeycomb structures of Examples 1 to 6 has high heat-insulating effect, and therefore, heat transfer to the outer wall portion is small in the case of using the structure as, for example, an exhaust gas catalyst carrier, and temperature of the cell structural portion easily rises. Incidentally, though high porosity and heat-insulating effect were shown in Examples 5 and 6, chipped portions of the outer wall wherein the outer wall portion has an inside shell layer located on the cell structural portion side and an outside shell layer located outside of the inside shell layer with the inside shell layer having a porosity higher than that of the outside shell layer, and
wherein the cell structural portion contains a ceramic material or a metallic material as a main component, and the outer wall portion contains a ceramic material as a main component.

2. A cell structure according to any claim 1, wherein the cell structural portion has a honeycomb structure or a foam-shaped structure.

3. A cell structure according to claim 1, wherein the cell structural portion contains a material having adsorbability or catalytic capability.

4. A cell structure according to claim 1, wherein the outer wall portion contains a material having adsorbability or catalytic capability.

5. A cell structure according to claim 1, wherein the cell structural portion has a honeycomb structure, and at least a part of cells are plugged at an end portion.

6. A cell structure according to claim 1, wherein a catalyst is loaded on the inside of the cells and/or the inside of the partition walls.

7. A cell structure according to claim 6, wherein the catalyst has a function of purifying automobile exhaust gas.

* * * * *